(No Model.)
M. J. COOK.
COMBINED PORTABLE ASH SAFE AND SIFTER.
No. 254,116. Patented Feb. 28, 1882.
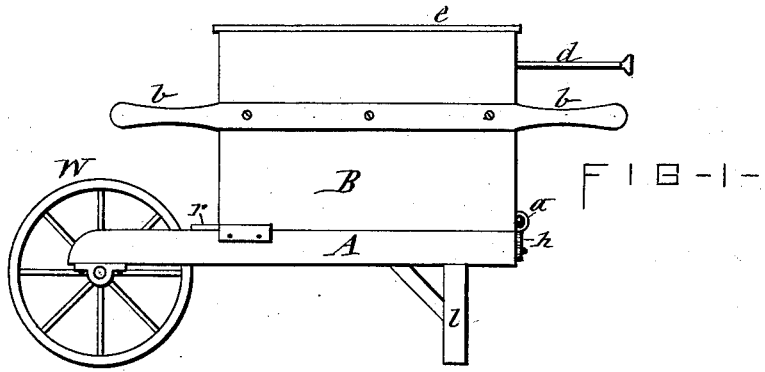
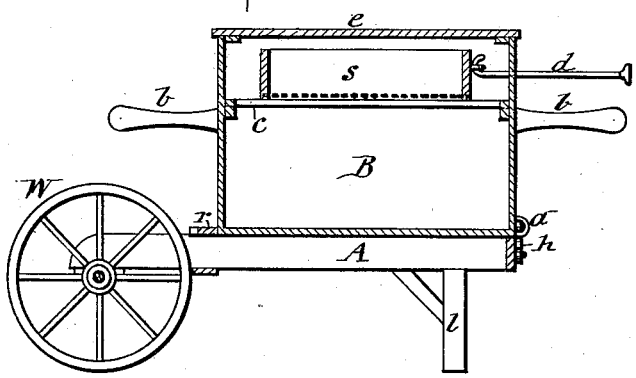 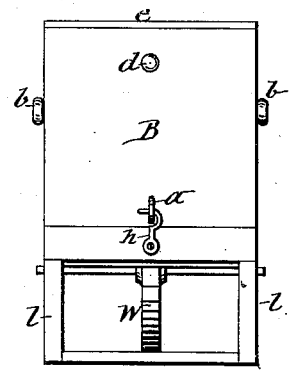
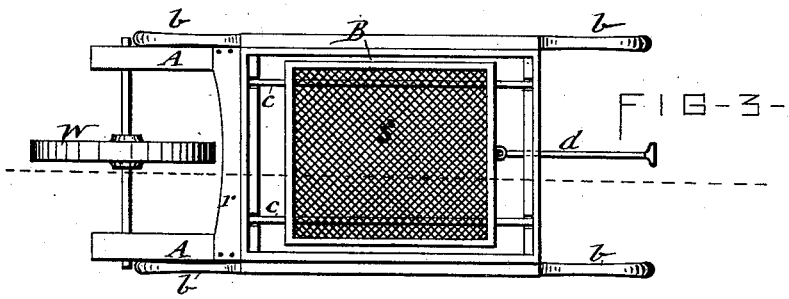
WITNESSES=
INVENTOR=
Mansfield J. Cook

UNITED STATES PATENT OFFICE.

MANSFIELD J. COOK, OF SYRACUSE, NEW YORK, ASSIGNOR OF ONE-HALF TO JASON I. FREEMAN, OF SAME PLACE.

COMBINED PORTABLE ASH SAFE AND SIFTER.

SPECIFICATION forming part of Letters Patent No. 254,116, dated February 28, 1882.

Application filed January 14, 1882. (No model.)

*To all whom it may concern:*

Be it known that I, MANSFIELD J. COOK, of Syracuse, in the county of Onondaga, in the State of New York, have invented new and useful Improvements in Portable Ash Safes and Sifters, of which the following, taken in connection with the accompanying drawings, is a full, clear, and exact description.

The object of this invention is to provide simple and convenient means for sifting ashes into a receptacle which is easily transported to the place where the ashes are to be deposited; and it consists chiefly of a frame provided with a carrying wheel or wheels or with sled-runners, according to the condition of the ground over which it is to be moved, and an ash-receptacle mounted removably on said frame and provided with handles for lifting and carrying said receptacle, and with a removable sieve sliding on guides in the interior of the ash-receptacle, all as hereinafter more fully explained, and specifically set forth in the claims.

In the annexed drawings, Figure 1 is a side elevation of my invention. Fig. 2 is a longitudinal section of the same; Fig. 3, a plan view with the cover removed; and Fig. 4 is a rear end view of the same with the cover applied.

Similar letters of reference indicate corresponding parts.

A represents a horizontal frame, supported at its forward end by a wheel, W, journaled thereon, and at the rear end by legs $l$, secured to said frame, the whole being similar to the frame and its supports of a wheelbarrow.

B denotes the ash-receptacle, in the form of a box, which is removably mounted on the frame A and held in place by resting with its base against a cross-bar, $r$, secured to the top of the forward portion of said frame, and by a hook, $h$, on the rear end of the frame engaging with a staple, $a$, on the rear end of the box B.

To the two sides of the box are secured two horizontal bars, which project at the ends of said box, and form handles $b\ b$ for lifting and carrying the box B off and onto the frame A, and for dumping it. Those handles $b$ which project from the rear end of the box are also made to serve as handles for the barrow-frame, upon which said box is mounted. The interior of the box B is provided with parallel bars or rods $c$, which are made removable, so as to adapt said box to serve as a receptacle for other substances than ashes.

Upon the bars $c$ is mounted movably a sieve, $s$. To the end of the sieve is detachably connected a handle, $d$, which protrudes through the end of the box B, and furnishes the means for reciprocating and shaking the sieve on the guide-bars $c$.

To the top of the box B is applied a removable cover, $e$, which is fitted perfectly air-tight to prevent egress of dust from the box during the process of sifting ashes.

I do not claim broadly the ash-receptacle with its sieve and cover, as I am aware the same is not new; but What I do claim as my invention, and desire to secure by Letters Patent, is—

1. The portable ash safe and sifter combined, consisting essentially of a frame provided with a carrying wheel or wheels or with sled-runners, and an ash-receptacle removably mounted on said frame and provided with a removable sieve sliding on guides in the interior of the ash-receptacle, all as set forth and shown.

2. The combination of the frame A, provided with the wheel W and with legs $l$ and hook $h$, the box B, provided with the staple $a$, end handles, $b\ b$, secured to the sides of the box, guide-bars $c$, arranged removably inside of the said box, the sieve $s$, mounted on said bars, the handle $d$, detachably connected to said sieve, and the removable cover $e$, all constructed and combined substantially in the manner described and shown.

In testimony whereof I have hereunto signed my name and affixed my seal, in the presence of two attesting witnesses, at Syracuse, in the county of Onondaga, in the State of New York, this 10th day of January, 1882.

MANSFIELD J. COOK. [L. S.]

Witnesses:
C. H. DUELL,
JASON J. FREEMAN.